Nov. 11, 1924.                                                              1,515,279
                                  J. SATO
                              STORAGE BATTERY
                            Filed May 11, 1923            3 Sheets-Sheet 1

Inventor:
Junjiro Sato
By
Attorneys

Nov. 11, 1924.
J. SATO
1,515,279
STORAGE BATTERY
Filed May 11, 1923  3 Sheets-Sheet 2
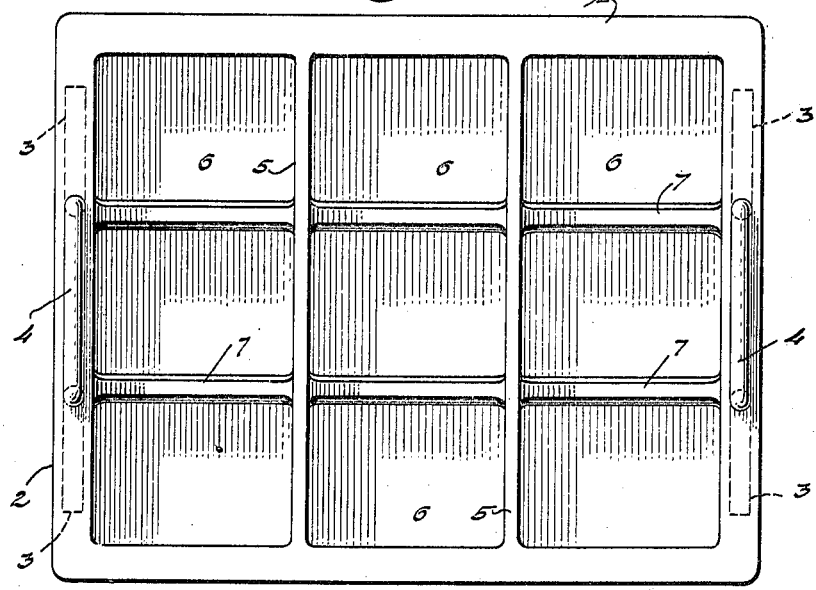
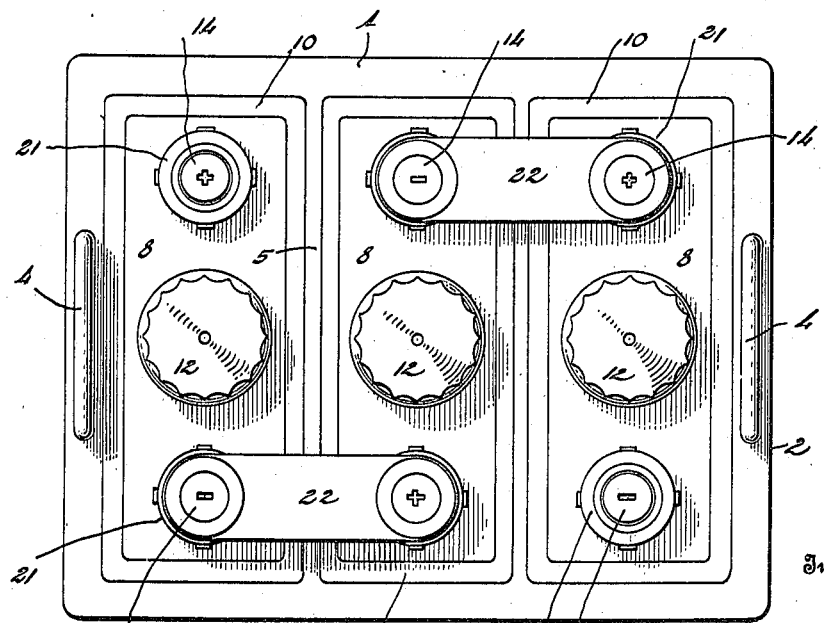
Inventor:
Junjiro Sato

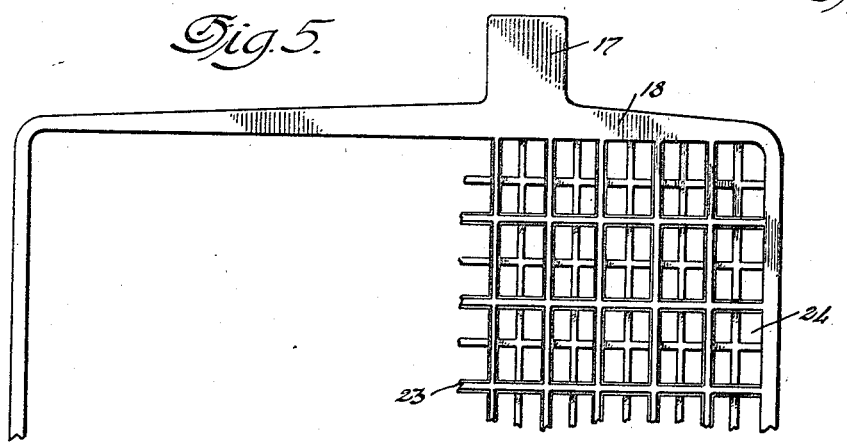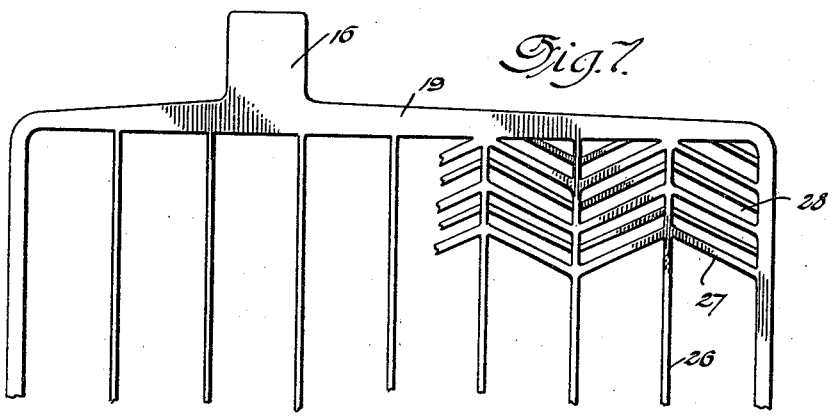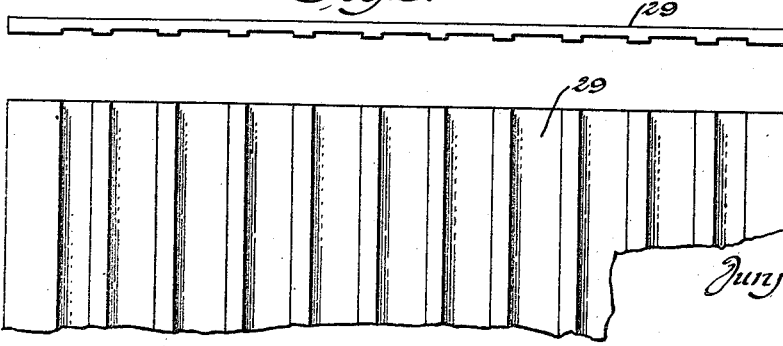

Patented Nov. 11, 1924.

1,515,279

UNITED STATES PATENT OFFICE.

JUNJIRO SATO, OF DETROIT, MICHIGAN.

STORAGE BATTERY.

Application filed May 11, 1923. Serial No. 638,156.

*To all whom it may concern:*

Be it known that I, JUNJIRO SATO, a subject of the Emperor of Japan, residing at Detroit, in the county of Wayne and State of Michigan, have invented certain new and useful Improvements in Storage Batteries, of which the following is a specification, reference being had therein to the accompanying drawings.

This invention relates to storage batteries, and has special reference to that class of batteries consisting of two sets of electrodes, positive and negative, immersed in an electrolyte. The electrodes, as ordinarily made comprise supporting foraminous grids filled with pastes of various compositions which are treated with an electric current in what is known as the forming charge to produce positive and negative plates. The electrolyte is ordinarily a dilute acid within a cell in which the positive and negative electrodes are arranged alternately in vertical positions, the adjacent plates being of opposite polarity and separated from each other by insulating means consisting of thin wooden separators. Such batteries are extensively used particularly in connection with a well known make of automobile and among the objects of my invention may be mentioned:—

First, to provide a storage battery which facilitates manufacture by eliminating several labor operations and to provide a battery which is more efficient and possesses a longer life, at a lower cost than similar batteries now in use.

Second, I provide a battery case made from a rubber composition, or a composition having similar characteristics, and such a case is practically immune to weather conditions and acid, particularly when a battery is subjected to an unprotected place about an automobile. Incidentally I reduce the problem of collecting materials for manufacturing the cases.

Third, in a battery of the above type I aim to provide a positive plate having nearly five more square inches of plate surface exposed to acid with three or more cubic inches of material than positive plates now in use, and even though a smaller number of these large substantial plates are used, I am able to obtain an energy sufficient to turn over an engine, through a starting motor, for a longer period of time and at approximately the same speed than the present type of battery used for this purpose.

Fourth, the various parts of the battery are proportioned so as to obtain a greater exposure of plate surface whereby I obtain greater capacity per plate and greater cubic contents for the plates, the resultant being a longer discharge at a given discharge rate, less buckling and heating of the plate, and consequently greater life.

In order that these distinct advantages may be apparent it will be necessary to more or less compare structural sizes of my battery plates with those commonly used, and to assist in this particular, reference will now be had to the drawings, wherein—

Fig. 3 is a plan of the case which provides the cells;

Fig. 4 is a plan of the complete battery;

Fig. 5 is an elevation of a portion of a negative plate grid;

Fig. 6 is a vertical sectional view of the same;

Fig. 7 is an elevation of a portion of a positive plate grid;

Fig. 8 is a vertical sectional view of the same;

Fig. 9 is a plan of a separator, and

Fig. 10 is a side elevation of a portion of the same.

Figure 1:
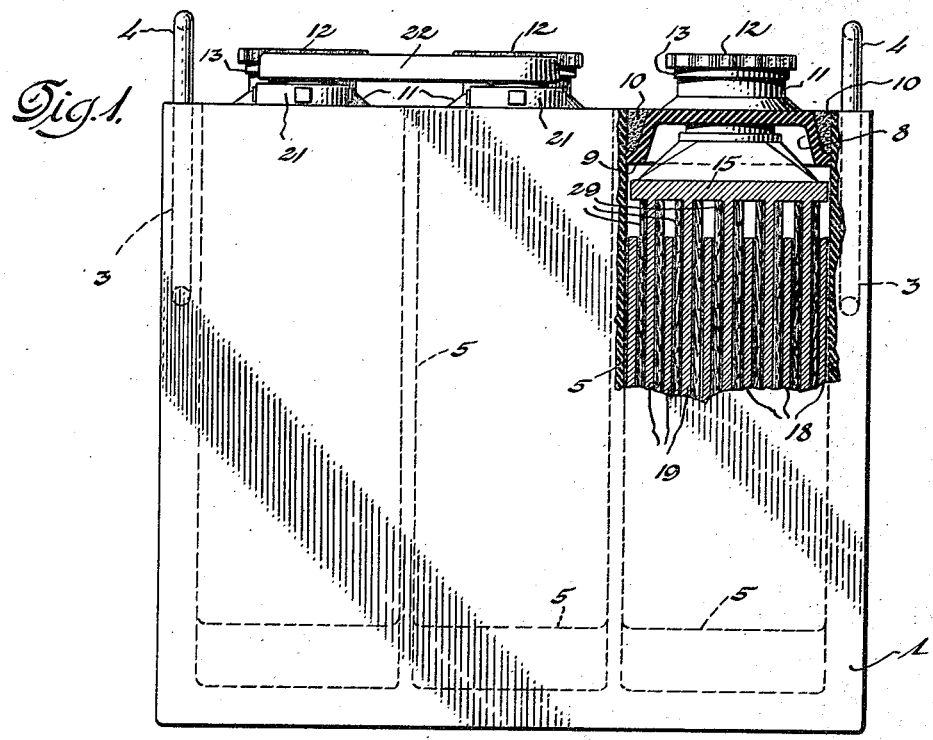
Figure 1 is a side elevation of my battery, partly broken away and partly in vertical section.
Figure 2:
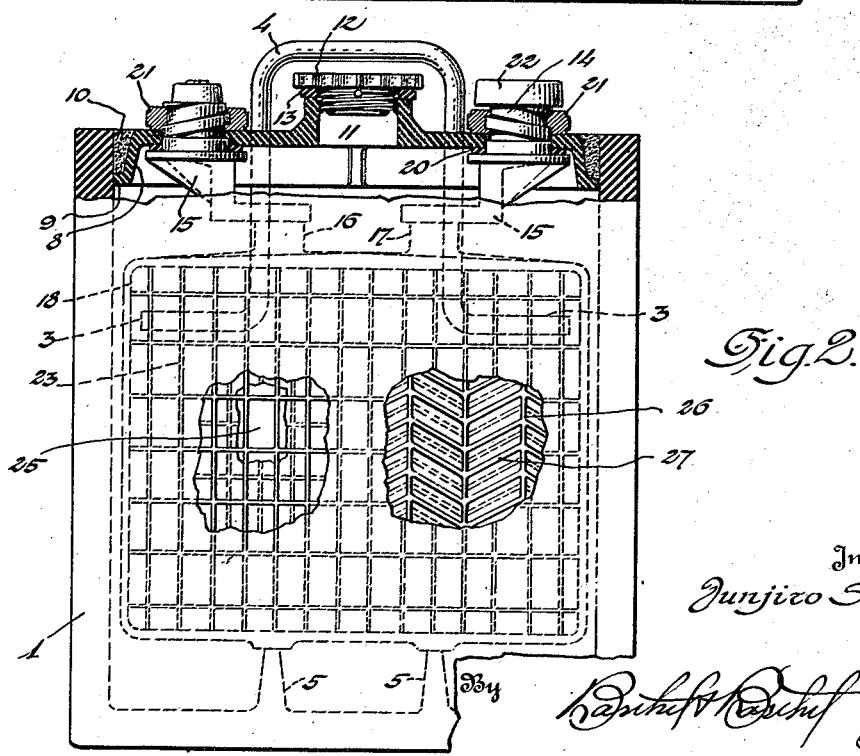
Fig. 2 is an end view of the same, partly broken away and partly in section.

In the drawings, the reference numeral 1 denotes a substantially rectangular case made from a rubber composition, or composition having similar characteristics, and embedded in the end walls 2 of the case are the angular ends 3 of inverted U-shaped handles 4. With this case made of rubber or a like composition, wood is eliminated for such purposes, also jars made of such material as to break and leak and it is in this connection that my cases are a saving from a manufacturing standpoint.

In the case are transverse partitions 5 dividing the same into three cells 6 and in the bottom of each cell are ribs or supports 7 forming wells for an electrolyte filling each cell.

Mounted in the upper open end of each cell is a cover plate 8 made of an insulation material, as rubber, and each cover plate has a marginal flange 9 engaging the inner walls of the cell and cooperating therewith in providing a marginal recess or groove adapted to receive a cover sealing material 10. This sealing material cooperates with the cover and case in excluding air and other elements, at the side edges of the cover.

Intermediate the ends of each cover plate is a filling connection 11 provided with a vent cap 12 having a washer 13 to permit of the connection between the cap and filling connection being made non-leakable, yet permit of the electrolyte being renewed.

Adjacent each end of the cover 8 is a terminal post 14 having a slotted horizontally disposed foot portion 15 and mounted in each foot portion are the risers 16 and 17 of alternately arranged vertically disposed negative plate grids 18 and positive plate grids 19, said grids resting on the supports 7 in the bottom of each cell. The terminal posts 18 are held in engagement with the cover 8 by washers 20 and nuts 21 and some of said terminal posts are connected by connectors 22, as best shown in Fig. 4.

Considering the negative plate grid, as shown in Fig. 5 it is in the form of a rectangular frame provided with a latticework of integral vertical and horizontal bars 23 providing a multiplicity of interstices, 24 in which may be anchored a paste 25. The bars 23 have a dove-tail configuration, as best shown in Fig. 6 which contributes to the holding of the paste in the grid.

The positive plate grid is also in the form of a frame having vertical bars 26 and angularly disposed bars 27, the latter being of a herring bone arrangement providing interstices 28 to receive a paste.

The positive plate grids are five in number and the negative plate grids six in number and extending between the positive plates, as best shown in Fig. 1. Insulating the positive plates from the negative plates are vertically grooved or ribbed separators 29. These separators are made from cedar or cypress wood, quarter-sawed about .100 inch in thickness and compared to separators now in use are approximately .020 thicker. This in reality permits of the separators being manufactured at a less cost than the usual separators, because scrappage, due to splits, checks, cracks and handling, is reduced to a minimum. By lessening rejections in connection with separators there is a material saving and the life of the separator is increased from fifty to one hundred per cent compared to separators now in use.

In the present type of storage battery using a wood case with three rubber jars therein considerable space is wasted because the case and jars take up about three-fourths of an inch of the length of the battery, one-fourth of an inch of the width, and about three-sixteenths of an inch of the height, which space I utilize for greater cubical contents of the cells. A comparison of the plates is also necessary.

Positive plate.

| | Old | New |
|---|---|---|
| Height | 4⅞" | 5" |
| Width | 5¼" | 6" |
| Thickness | .09375" | .135" |
| Sq. inches exposed to acid | 55.452" | 60.00" |
| Cubic inches of material | 5.196" | 8.10" |

Negative plate.

| | Old | New |
|---|---|---|
| Height | 4⅞" | 5" |
| Width | 5¼" | 6" |
| Thickness | .09375" | .135" |
| Sq. inches exposed to acid | 55.452" | 60.00" |
| Cubic inches of material | 5.196" | 6.9" |

It is to be noted that the new positive plate is an eighth of an inch higher, five-sixteenths of an inch wider and .0411¼ inch thicker, allowing more material exposed to the acid and a greater cubical content. The greater surface exposed gives greater capacity per plate and a consequent longer discharge at a given discharge rate with less buckling and heating of the plate. The plates can be manufactured with a smaller percentage of scrap from poor pasting, inability of active material to adhere to a grid, and breakage from handling and shipping.

Taking into consideration all the advantages gained, compared to the old type of battery, it is obvious that I have a material improvement, and while in the drawings there is illustrated a preferred embodiment of my invention, it is to be understood that the structural elements are susceptible to such changes as fall within the scope of the appended claim.

What I claim is:—

An improved complete battery comprising an outer composite casing integrally partitioned to provide cells, a cover for said cells, terminals in said cover, connectors between certain of said terminals, positive and negative plates in said cells, said plates connected to respective terminals and separators between said plates, said plates and separators being enclosed solely by said outer casing and cover, and in width and combined thickness approximately filling said cells, whereby maximum dimension and cubical content of said plates with respect to the size of said battery is secured.

In testimony whereof I affix my signature in presence of two witnesses.

JUNJIRO SATO.

Witnesses:
J. H. SHOEMAKER,
K. H. BUTLER.